United States Patent [19]

Sahni

[11] Patent Number: 5,184,345
[45] Date of Patent: Feb. 2, 1993

[54] ENHANCED ISDN 800 SERVICE

[75] Inventor: Paramdeep S. Sahni, Marlboro, N.J.

[73] Assignee: AT&T Bell Laboratories, Murray Hill, N.J.

[21] Appl. No.: 636,812

[22] Filed: Jan. 2, 1991

[51] Int. Cl.$^5$ .................... H04J 3/12; H04M 11/06
[52] U.S. Cl. .................... 370/54; 370/110.1; 358/85; 379/53; 379/93; 379/114
[58] Field of Search ............... 370/16.54, 58.1, 110.1; 358/84.85; 379/53, 54, 93, 94, 96, 100, 114, 115, 127

[56] References Cited

U.S. PATENT DOCUMENTS

| | | | |
|---|---|---|---|
| 4,027,104 | 5/1977 | Levitt et al. | 379/127 |
| 4,056,690 | 11/1977 | Brolin et al. | 379/127 |
| 4,533,943 | 8/1985 | Poirier | 379/54 |
| 4,939,767 | 7/1990 | Saito et al. | 379/53 |
| 5,008,884 | 4/1991 | Yazawa et al. | 370/110.1 |
| 5,046,183 | 9/1991 | Dorst et al. | 370/110.1 |
| 5,046,189 | 9/1991 | Kainuma | 379/93 |

OTHER PUBLICATIONS

AT&T Networks ISDN Primary Rate Interface Specification Technical Reference 41449, Aug. 1991.
AT&T Networks ISDN Primary Rate Interface and Special Applications Specification, Technical Reference 41459, Oct. 1991.
AT&T Technical Journal, vol. 66, Issue 3, May-Jun. 1987, articles: "ISDN Architecture," R. T. Roca, pp. 5-17; ISDN Standards Evolution, Hair Aldermeshlan, pp. 19-25; AT&T Communications ISDN Architecture, M. L. Higdon, et al., pp. 27-33.
AT&T Technical Journal, vol. 65, Issue 1, Jan.-Feb. 1986, Article entitled "AT&T Network Architecture Evolution," J. L. Commings, et al., pp. 2-11.

Primary Examiner—Douglas W. Olms
Assistant Examiner—Alpus H. Hsu
Attorney, Agent, or Firm—Henry T. Brendzel

[57] ABSTRACT

An enhanced "800" service automatically provides a second communications path between a customer and a business in order to provide additional product information, such as video information, to the customer. For example, upon receipt of a customer telephone call on a B-channel of an ISDN facility, premise switching equipment, of the business, automatically receives the customer's network address. This address is used to automatically setup the second communications path to the customer.

22 Claims, 5 Drawing Sheets

ENHANCED ISDN 800 SERVICE

BACKGROUND OF THE INVENTION

The present invention relates to telecommunications systems and particularly to "800" telecommunications networks.

In any business, providing information to a customer is often critical in order to allow the customer to make an informed decision about buying a product or service from the business. In providing such information to the customer, the business is typically concerned about any costs the customer must bear in order to obtain the information and the type of information provided to the customer. In particular, a business which relies on a telephone call for contact with the customer is concerned about the cost of the telephone call to the customer and the type of information conveyed through the telephone call.

Since a customer who has to pay for a telephone call to a business in order to inquire, i.e., receive information, about a product or service may be less inclined to make the telephone call to the business, two alternative methods currently exist to eliminate this cost. A business may use an outward bound telecommunications service (e.g., the AT&T MEGACOM ® service), i.e., where the business is the calling party thereby eliminating the cost of the telephone call to the customer, the called party. However, since the telephone call is initiated by the business, the business typically calls customers which may not be interested in the products or services of the business. As a result, some percentage of the telephone calls to customers are actually wasted. An alternative to an outward bound telecommunications service is an "800" telecommunications service, i.e., one which allows a customer to be the calling party, at no cost to the customer. An "800" telecommunications service is provided to a subscribing business by a telecommunications network. As a result, interested customers are provided with an incentive to call a business in order to inquire, i.e., get information, about the products and services of the business.

Once a telephone call is established between the calling party and the called party, by an outward bound or an "800" service (thereby eliminating the cost to the customer in obtaining the information), the business is concerned about the type of information that is conveyed through the telephone call. In current outward bound or "800" services, the business typically provides another person, i.e., a representative of the business to provide verbal, or audio, information to the customer in order to assist the customer in making a buying decision.

SUMMARY OF THE INVENTION

I have come to realize that the prior art arrangement of providing information to a customer in order to make a buying decision is disadvantageous since in either an outward bound service or an "800" service, product or service information is exchanged between a customer and a business only over a voice channel, i.e., an audio path. As a result, the customer is provided with verbal descriptions of services or products from a representative of the business in order to make a buying decision. In some situations however, a picture of the product or sales brochure can make the difference in the decision-making process. Therefore, in accordance with the invention, a second communications path is automatically provided between the calling party and the called party on which visual, or image, information about a product or service is exchanged between the calling party and the called party.

In a preferred embodiment, the AT&T MEGACOM 800 (M800) service is enhanced to provide a mechanism to exchange visual or image information, via ISDN facilities, simultaneously with the exchange of audio information by the M800 service. Specifically, a business subscribes to the M800 telecommunications service which allows a customer to call the business, at no-charge, to inquire about a product or service. The M800 telecommunications service is provided to the business through a Primary Rate Interface (PRI) Integrated Services Digital Network (ISDN) telecommunications facility. In addition, the customer is provided access to the M800 telecommunications service through a Basic Rate Interface (BRI) Integrated Service Digital Network (ISDN) facility. In order to inquire about product or service information the customer dials the "800" number, associated with the business, using a BRI ISDN terminal. While the customer is making the inquiry a second communications path is automatically established between the customer and the business to convey visual, or image, information pictorially describing the product or services of the business.

In accordance with a feature of the invention, the second path is automatically established by the called party, e.g., when the business desires to provide the customer with additional information such as by providing access to an image data base of products.

In accordance with another feature of the invention, the second path is automatically established by the calling party, e.g., during the customer's call in order to gain access to an image data base of products for additional information.

In establishing the second communications path to the business, the telephone call is either an "800" call or a "plain old telephone service" (POTS) call. However, a potential inconvenience can arise to the business in that two separate billing-records (one for each of the communications paths) may be generated for the one transaction. For example, in the case of a POTS call, the calling party may negotiate with the called party for reverse billing in which case the called party would inform the network of its acceptance of the billing charges. Therefore, in accordance with another feature of the invention, the billing-records of the two separate telephone calls are correlated so as to provide one combined billing-record for the transaction to the business.

DETAILED DESCRIPTION

As noted earlier, a business is typically concerned about providing enough information to a customer to enable the customer to make an informed decision about buying a product or service from the business. In providing such information to the customer, the business is typically concerned about any costs the customer must bear in order to obtain the information and the type of information provided to the customer. In particular, a business which relies on a telephone call for contact with the customer is concerned about the cost of the telephone call to the customer and the type of information conveyed through the telephone call.

Although both an outward bound telecommunications service and an "800" telecommunications service each address, in their own way, the cost of the telephone call to the customer, both the outward bound service and "800" service only provide a single voice path, i.e., an audio connection, between the calling party and the called party. As a result, the customer, although obtaining free information, has limited access to information, i.e., receives only verbal descriptions of products or services from a representive of the business in order to make a buying decision. In some situations however, a picture of the product or sales brochure can make the difference in the decision-making process. Therefore, in accordance with the invention, a second communications path is automatically provided between the calling party and the called party on which visual, or image information about a product or service is exchanged between the calling party and the called party.

Figure 1:
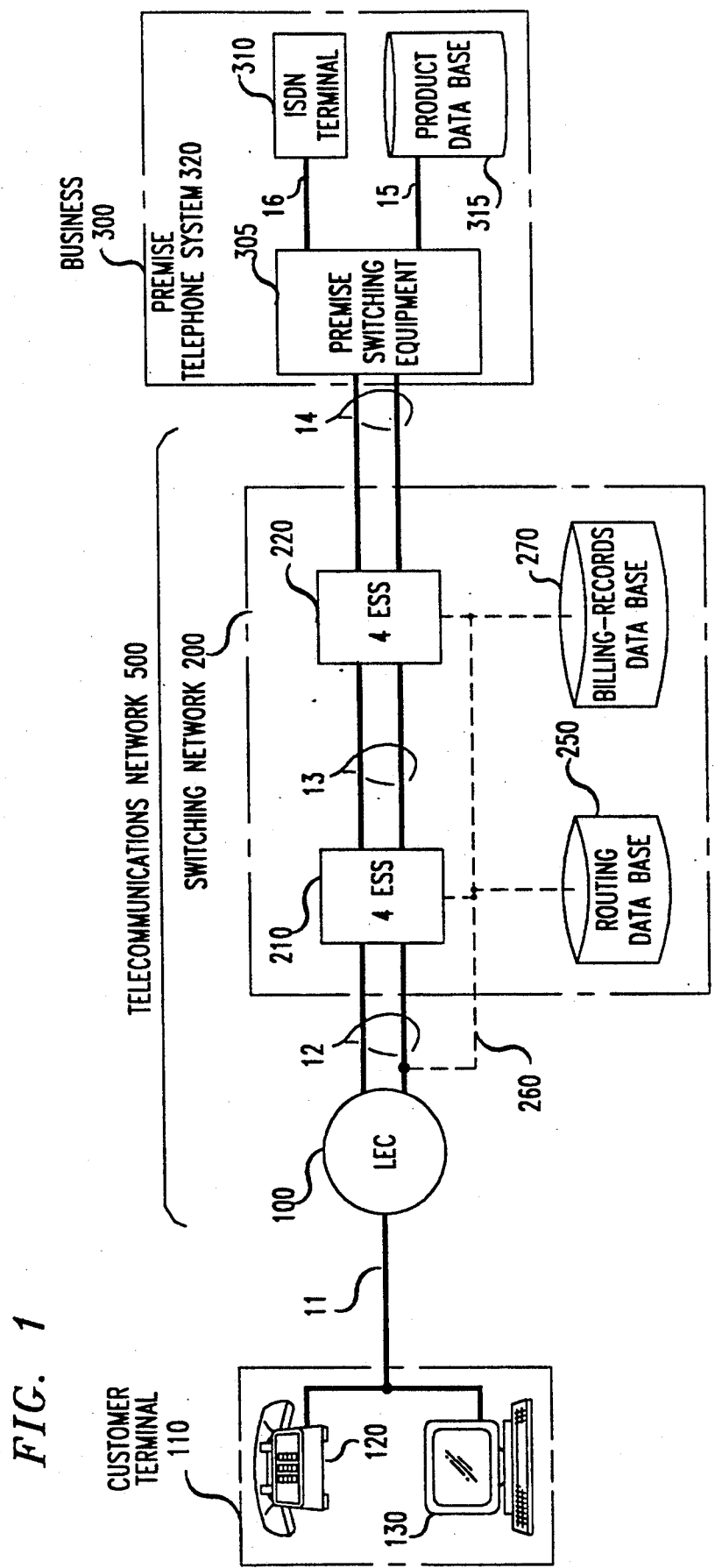
FIG. 1 is a block diagram of an illustrative communications system embodying the principles of the invention.

A representative communications system, embodying the principles of the invention, is shown in FIG. 1. It is assumed, for illustrative purposes only, that business 300 subscribes to an "800" telecommunications service such as the MEGACOM 800 (M800) service from AT&T. The M800 service is provided by switching network 200 and allows a customer at customer terminal 110 to dial business 300, at no charge (toll-free), to place an order, or even request a service, from the convenience of his or her residence or office. The communications system of FIG. 1 is comprised of well-known technologies, and references to relevant illustrative technical material are included hereinbelow. In addition, it is assumed the nomenclature of a "telephone call" is understood to represent any of the well-known methods, processes and technologies used in telecommunications for supporting a voice, or data, communication between a starting point—the calling party—and a destination point—the called party.

Customer terminal 110 represents one of a plurality of customers. Customer terminal 110 is comprised of voice terminal 120 and data terminal 130. Voice terminal 120 allows a customer to send and receive audio information, and data terminal 130 allows a customer to send and/or receive data, e.g., pictorial data sent as image information (e.g., still pictures as well as video). For the purposes of this example, terminal 110 is, as is known in the art, an Integrated Voice/Data Terminal (IVDT), i.e., voice terminal 120 and data terminal 130 are physically integrated together in customer terminal 110. Customer terminal 110 is connected to local exchange carrier (LEC) 100, of telecommunications network 500, via "Basic Rate Interface" (BRI) Integrated Services Digital Network (ISDN) facility 11. LEC 100 is representative of one of a plurality of local exchange carriers that are served by switching network 200 and is typically comprised of stored-program-control switching system technology. Stored-program-control switching technology is generally described in *The Bell System Technical Journal*, Vol. 56, No. 2, February, 1977, and Vol. 64, No. 6, Part 2, July–August, 1987. LEC 100 is connected through path 12 to switching network 200. Path 12 is representative of well-known network access facilities, such as trunks and other stored-program-control switches through which a telephone call is routed to switching network 200. Switching network 200 is illustratively comprised of a plurality of stored-program-control switching systems, herein represented by 4 · ESS TM digital switches 210 and 220 available from AT&T. The 4 ESS digital switch is described in detail in *The Bell System Technical Journal*, Vol. 56, No. 7, September, 1977, and Vol. 60, No. 6, Part 2, July–August, 1981. For the purposes of this example, 4 ESS switching systems 210 and 220 are representative of the originating and terminating points, respectively, of switching network 200. (Examples of network architecture can be found in the *AT& T Technical Journal*, Vol. 66, Iss. 3, May–June, 1987.) An illustrative telephone call will enter switching network 200 through switch 210, the originating point of the telephone call in switching network 200. Switch 210 will access network routing data base 250 in a well-known way for routing information in order to route the telephone call to terminating switch 220 through path 13. Path 13 may include other network stored-program-control switches and represents typical network interconnecting trunk facilities through which an illustrative telephone call may be routed. Switching network 200 serves a plurality of businesses such as business 300. Business 300 is connected to 4 ESS switch 220 over trunk facility 14, illustratively a "Primary Rate Interface" (PRI) Integrated Services Digital Network (ISDN) facility. ISDN technology is described in the *AT&T Technical Journal*, Vol. 66, Iss. 3, May–June, 1987, and, Vol. 65, Iss. 1, January–February, 1986. ISDN trunk facility 14 terminates in premise telephone system 320. Premise telephone system 320 is illustratively comprised of premise switching equipment (PSE) 305, herein represented as an AT&T System 85 digital PBX—which supports a plurality of user terminals herein represented by ISDN terminal 310—and product data base 315.

In order to provide the ability to route an illustrative telephone call from customer terminal 110 to business 300, telecommunications network 500 of FIG. 1 also includes well-known Common Channel Signaling (CCS) network 260 for transferring control information such as billing, routing, and supervisory information messages between the representative stored-program-control switching systems shown in FIG. 1. A typical CCS network is described in *The Bell System Technical Journal*, Vol. 57, No. 2, February, 1978, and Vol. 61, No. 7, September, 1982, and in the *AT&T Technical Journal*, Vol. 66, Iss. 3, May–June 1987, and, Vol. 65, Iss. 1, January–February, 1986. For the purposes of this example, it is assumed that CCS network 260 conforms to the standards for Signalling System number 7 (SS7) as described in *American National Standards Institute* (ANSI) T1.114 through T1.115. In addition, it is assumed that all ISDN equipment utilizes the well-known ISDN Q.931 protocol, and supports ISDN applications as defined in *AT&T Networks ISDN Primary Rate Interface Specification*, Technical Reference 41449, April 1989, and *AT&T Networks ISDN Primary Rate Interface*

*and Special Applications Specification*, Technical Reference 41459, April 1989. Finally, it is assumed that the switching system, and interconnecting trunk facilities, can supply the well-known Automatic Number Identification (ANI) of the calling party in order to establish the location of the calling party in telecommunications network 500, i.e., the calling party's network address. A telephone signaling protocol for supplying ANI from a LEC to a network switching system is described in U.S. Pat. No. 4,555,594, issued Nov. 26, 1985, to Friedes et al.

Figure 2:
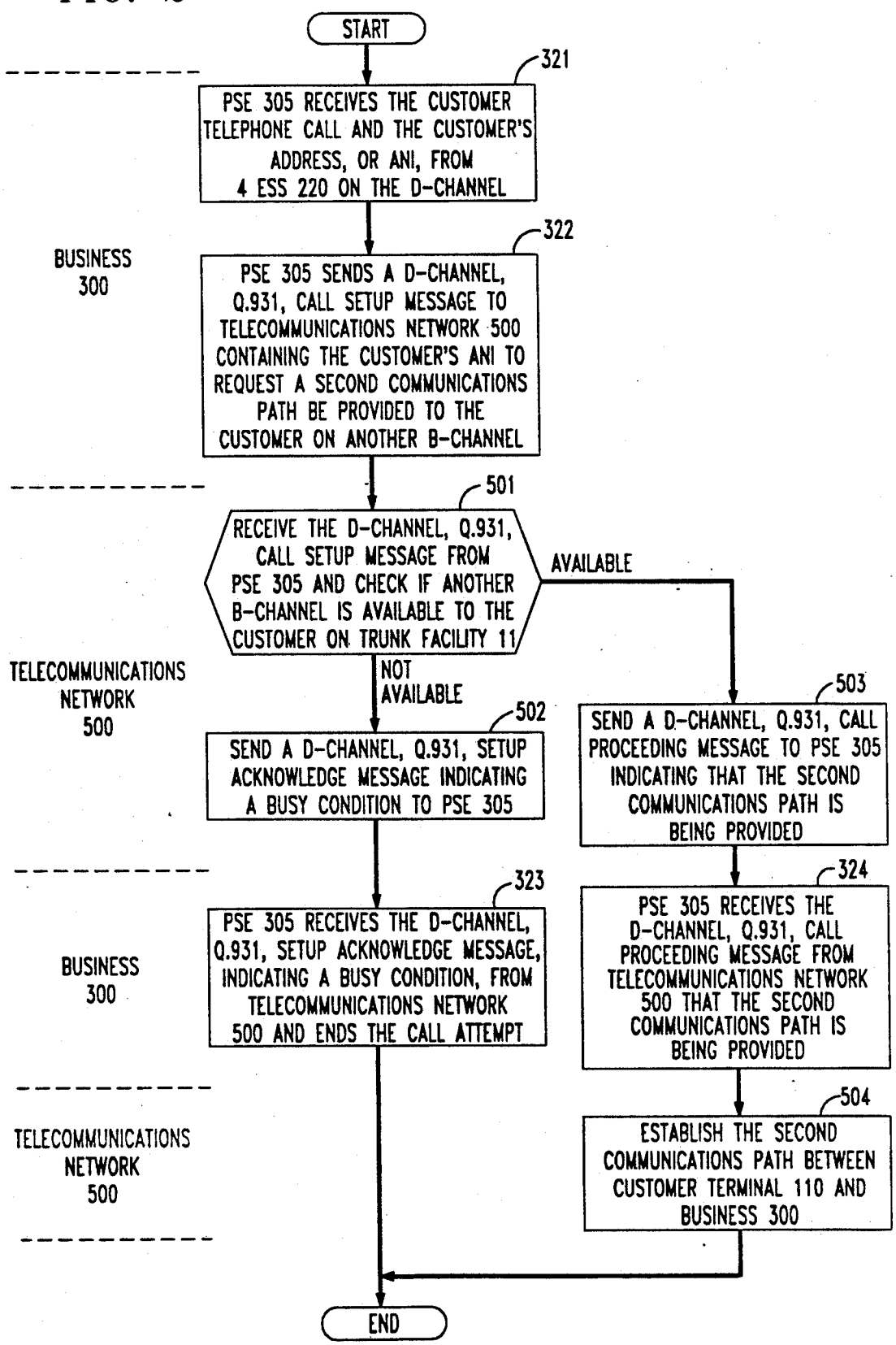
FIG. 2 is a flow diagram of a first illustrative method used in the communications system of FIG. 1.

Trunk facility 14 represents the number of PRI ISDN trunks subscribed to by business 300. As is known in the art, each PRI ISDN trunk consists of 23 lines, or "B-channels", that are available to business 300 for use in sending and receiving information. In addition, each trunk also consists of a "D-channel" which is used for sending signalling and control data in order to manage the information carried by each of the respective 23 B-channels. Trunk facility 11 represents a BRI ISDN trunk, which is comprised of 2 B-channels and a D-channel, subscribed to by the customer. As is well-known in the art, a customer at customer terminal 110 can originate a typical "800" telephone call by dialing a predetermined "800" number which corresponds to business 300. The telephone call is then routed through telecommunications network 500 to 4 ESS 220. 4 ESS 220 routes the telephone call to PSE 305, of business 300, on one of the available B-channels of ISDN facility 14. Business 300 completes the call from customer terminal 110 when a representative of business 300 answers the incoming telephone call at ISDN terminal 310 and initiates a voice conversation with the customer. Thus, a communications path through telecommunications network 500 is established between the customer—the calling party—and the business—the called party. In order to facilitate understanding of the inventive concept, reference can also be made to FIG. 2 which represents a first illustrative method used herein.

Upon receiving the customer telephone call on one of the B-channels of trunk facility 14, PSE 305 also receives the customer's network address, or telephone number, i.e., ANI, from 4 ESS 220 on the D-channel of trunk facility 14 (block 321). (It is assumed herein that the respective control information on the D-channel associated with the one B-channel is also a part of the communications path established between the calling party and the called party.) At this point, as in the prior art, a single communications path is established between customer terminal 110 and business 300. However, this single communications path only allows business 300 to provide verbal, or audio, information to the customer. Therefore, in accordance with the invention, PSE 305 sends a D-channel, Q.931, call SETUP message, containing the customer's ANI, to telecommunications network 500 to request a second communications path be provided to the customer on another B-channel (block 322). This second communications path is used to provide visual, or image, information to the customer to enhance the verbal information provided by business 300 and thereby increase the opportunities for completing a sale to the customer.

The D-channel, Q.931, call SETUP message, from PSE 305, is received by telecommunications network 500 which then checks if another B-channel is available to the customer on trunk facility 11 (block 501).

If another B-channel is not available on trunk facility 11, a D-channel, Q.931, SETUP ACKnowledge message indicating a busy condition is sent from telecommunications network 500 to PSE 305, of business 300 (block 502). The D-channel, Q.931, SETUP ACKnowledge message, indicating the busy condition, is received by PSE 305 and the call attempt ends. (block 323).

If another B-channel to customer terminal 110 is available, a D-channel, Q.931, CALL PROCeeding message is sent from telecommunications network 500 to PSE 305, of business 300 (block 503). The D-channel, Q.931, CALL PROCeeding message, from telecommunications network 500, is received by PSE 305 as acknowledgement that the second communications path is being provided (block 324).

Telecommunications network 500 then establishes the second communications path between customer terminal 110 and business 300 (block 504). After the second communications path is established between business 300 and customer terminal 110, additional product information can now be provided to the customer in order to increase the possibility of completing a sale of a product or service. For example, using well-known techniques, image information stored in product data base 315 can be transmitted to data terminal 130. Additionally, using well-known premise switching equipment features such as bridging, the representative of the business at ISDN terminal 310 can select from product data base 315 the images to be transmitted on the second communications path to data terminal 130. Thus, additional visual, or image, information can be sent to the customer simultaneously with the verbal information thereby supplementing and enhancing the verbal information being provided by the representative of the business.

Figure 3:
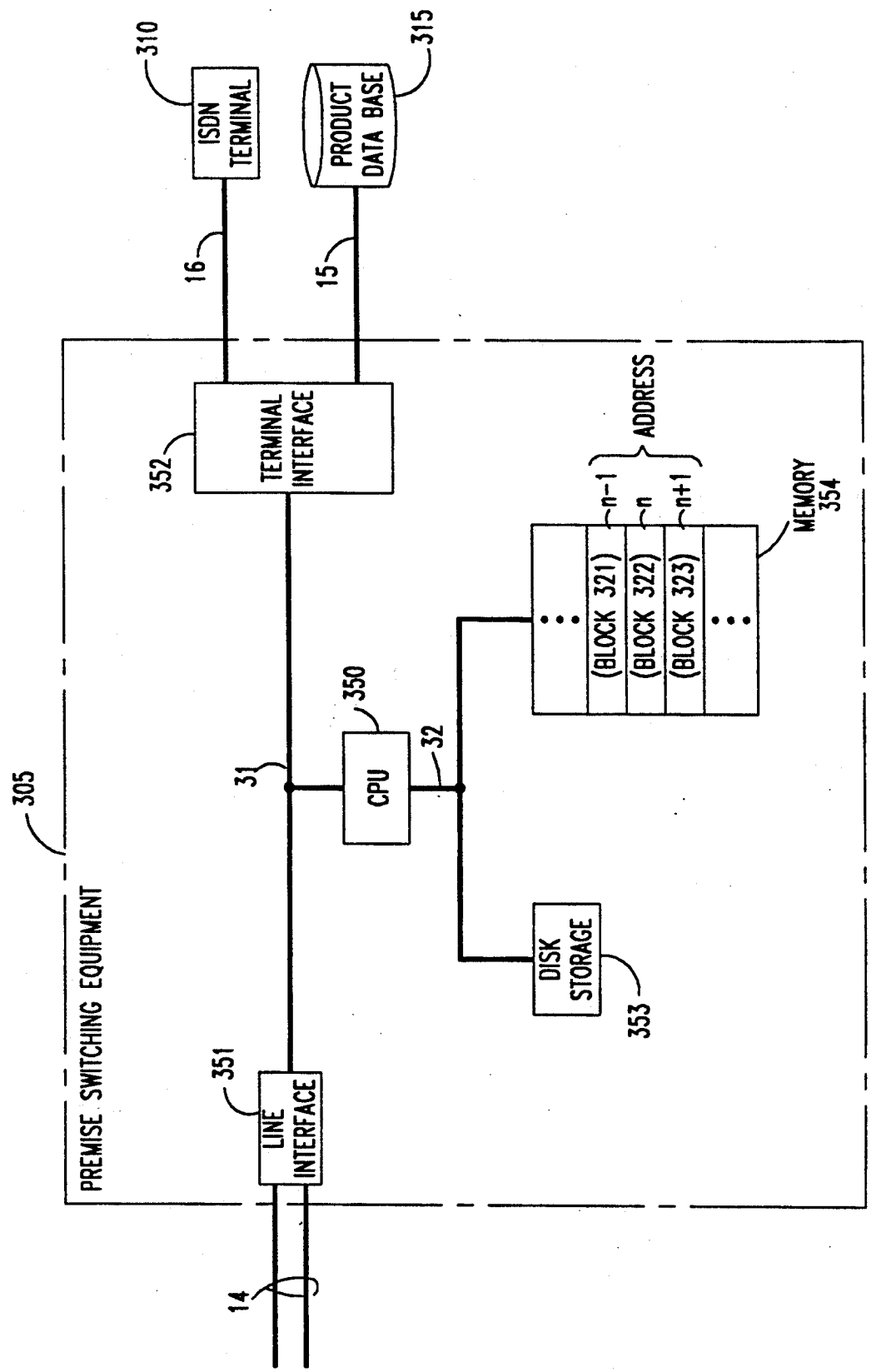
FIG. 3 is a block diagram of illustrative premise switching equipment 305 used in the communications system of FIG. 1.

Before proceeding with a description of a second illustrative method, attention is directed to FIG. 3 which shows a block diagram of PSE 305 which is illustrative of a stored-program-control switching system in accordance with the invention. For the purposes of the first method described hereinabove, PSE 305 is comprised of the following elements: line interface 351, terminal interface 352, CPU 350, disk storage 353, memory 354, and paths 31 and 32. (These elements are well-known in the art and further information can be sought in the references described hereinabove; e.g., path 31 is further comprised of data and control connections which are typically used in a stored-program-control switching system.) Line interface 351 provides the interface between ISDN trunk facility 14 and path 31. Terminal interface 352 provides the interface between customer premise equipment, herein represented by ISDN terminal 310 and product data base 315, and path 31. CPU 350 is a microprocessor based central processing unit, i.e., CPU 350 operates on, or executes, program data stored in memory 354, via path 32, for controlling the flow of data and control information between line interface 351 and terminal interface 352. Additionally, CPU 350 may also have access to disk storage 353 to provide for a larger storage capacity than memory 354. Memory 354 is illustratively comprised of a number of storage locations, of which a subset is shown in FIG. 3. In each storage location, data representative of the program, i.e., program data, is stored. (For the purposes of this example, it is assumed memory 354 is illustratively comprised of random access memory (RAM) as opposed to read only memory (ROM). Further, the storage locations shown are only representative, e.g., the storage location for block 321 may actually be comprised of additional storage locations which are needed to store a program which is representative of block 321). In the context of the first illustrative method described hereinabove, the steps performed by PSE 305 are stored in memory 354, beginning at location n-1, and operated on, or executed, by CPU 350. For example, after the first communications path is established between customer terminal 110 and business 300, CPU 350, of PSE 305, executes a program comprised of program data representative of block 321 at memory location n-1. As a result, FIG. 3 shows how the illustrative method of FIG. 2 can be implemented in a stored-program-control switching system such as PSE 305.

Figure 4:
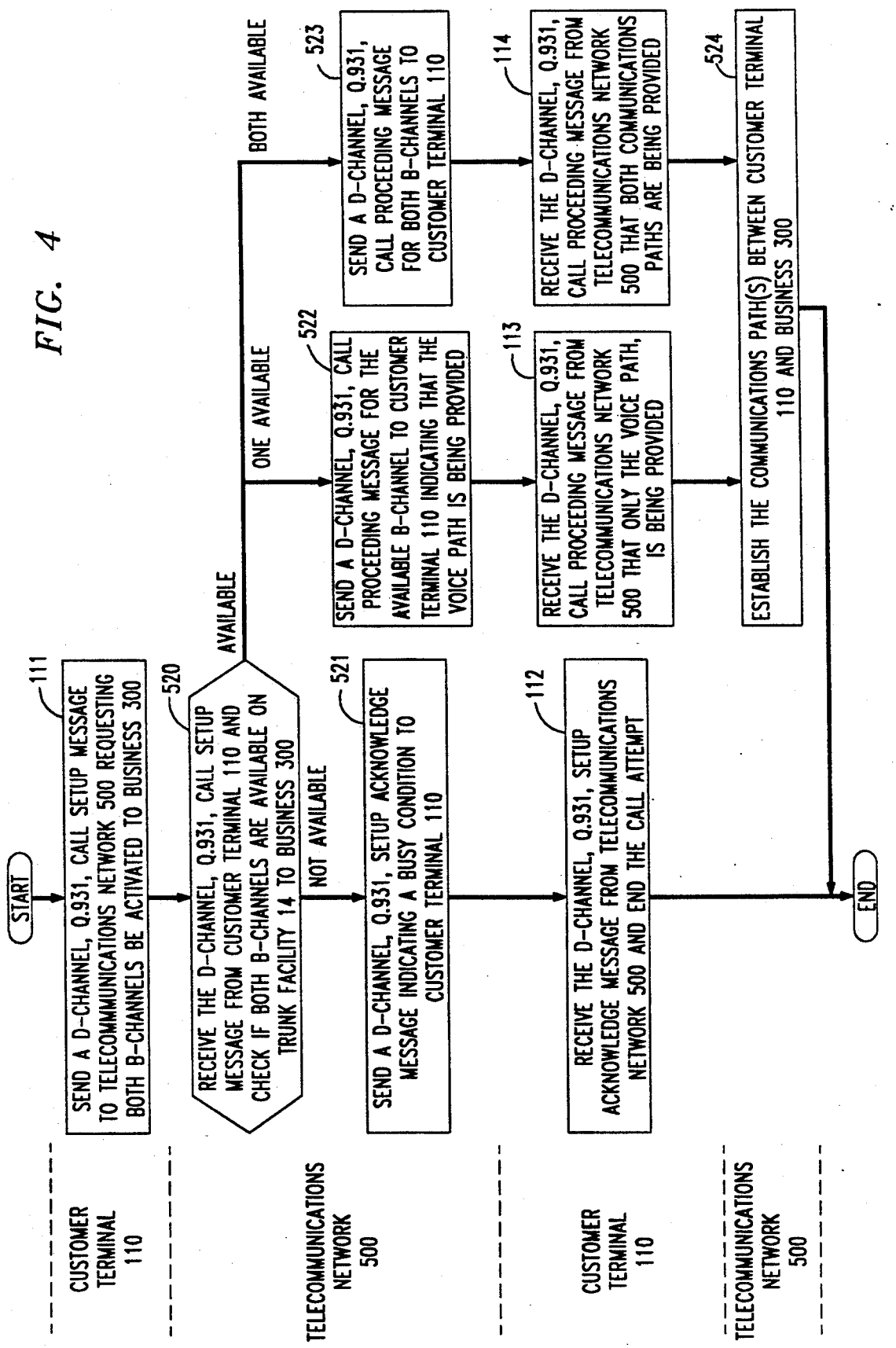
FIG. 4 is a flow diagram of a second illustrative method used in the communications system of FIG. 1.

As an alternative to the first illustrative method, the customer, at customer terminal 110, can automatically establish the second communications path while initiating the first communications path to business 300. A second illustrative method using this approach, in the system of FIG. 1, is shown in FIG. 4.

Customer terminal 110 sends a D-channel, Q.931, call SETUP message to telecommunications network 500 requesting both B channels be activated to business 300 for the "800" telephone call (block 111).

The D-channel, Q.931, call SETUP message from customer terminal 110 is received by telecommunications network 500 which then checks if both B-channels are available on trunk facility 14 to business 300 (block 520).

If both B-channels are not available on trunk facility 14, a D-channel, Q.931, SETUP ACKnowledge message indicating a busy condition is sent from telecommunications network 500 to customer terminal 110 (block 521). The D-channel, Q.931, SETUP ACKnowledge message is received by customer terminal 110 and the call attempt ends (block 112).

If only one of the B-channels to business 300 is available, a D-channel, Q.931, CALL PROCeeding message, for the one B-channel, is sent from telecommunications network 500 to customer terminal 110 indicating that only the voice call is being established to business 300 (block 522). The D-channel, Q.931, CALL PROCeeding message, from telecommunications network 500, is received by customer terminal 110 as acknowledgement that only the voice call is being established through telecommunications network 500 (block 113).

If both of the B-channels to business 300 are available, a D-channel, Q.931, CALL PROCeeding message is sent from telecommunications network 500 to customer terminal 110 (block 523). The D-channel, Q.931, CALL PROCeeding message, from telecommunications network 500, is received by customer terminal 110 as acknowledgement that the first and second communications paths are being established by telecommunications network 500(block 114).

Finally, if either one or both B-channels are available, telecommunications network 500 then establishes the communications path(s) between customer terminal 110 and business 300 (block 524).

Figure 5:
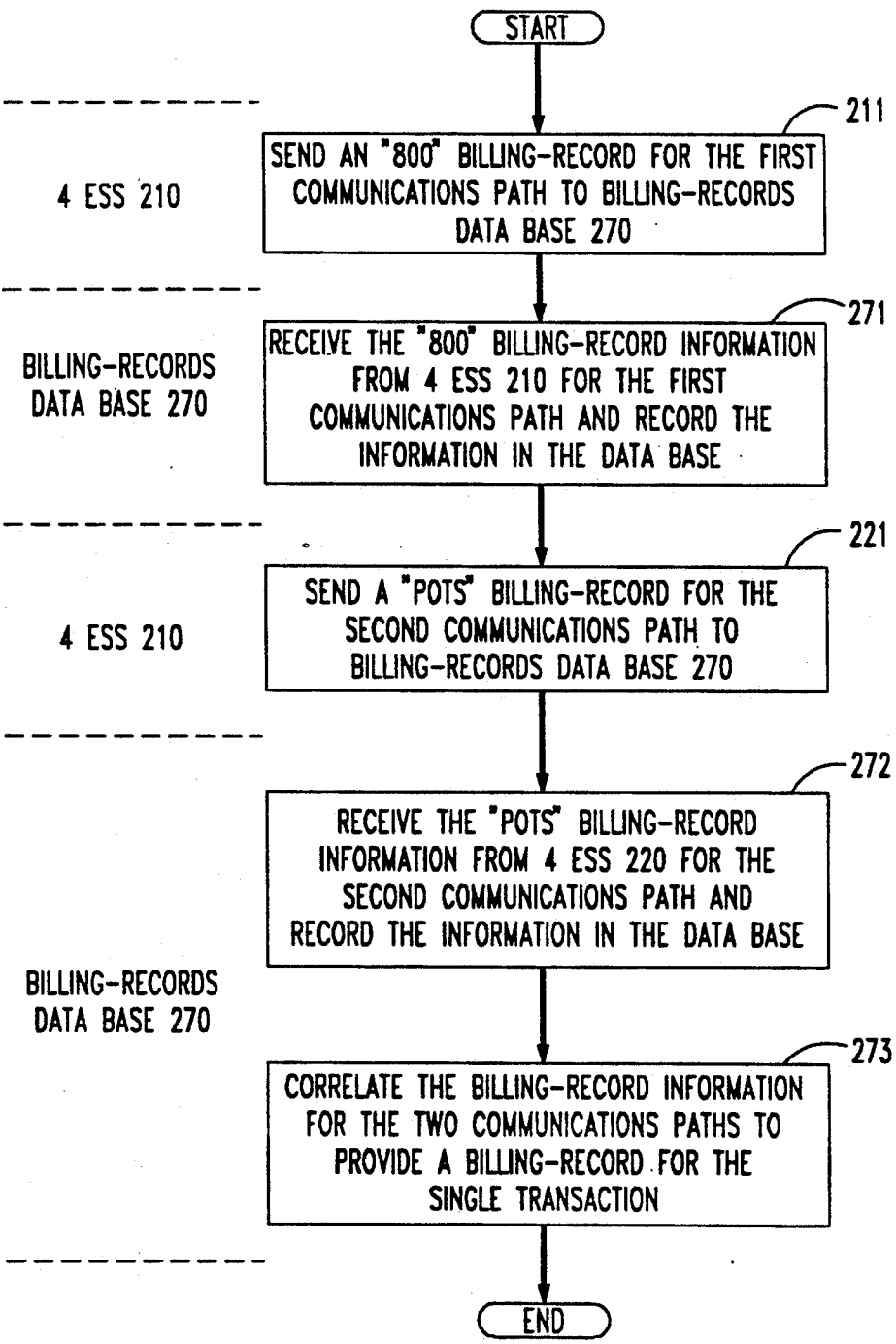
FIG. 5 is a flow diagram of an illustrative billing method used with the method of FIG. 2 in the communications system of FIG. 1.

As shown in both of the illustrative methods described hereinabove (assuming the availability of two B-channels) two separate communications paths are established between customer terminal 110 and business 300. However, in the prior art, business 300 receives a bill, i.e., a list of individual billing-records for each communications path established with their customers. In fact, in the first illustrative method described hereinabove, business 300 receives a bill for the M800 service customer telephone calls (representative of the costs of the first communications path) and a separate bill for the "plain old telephone service" (POTS) (representative of the costs of the second communications path). (In the first illustrative method, the second communications path is a POTS telephone call since the second communications path is established by providing the customer's telephone number, or ANI, to telecommunications network 500. This is in contrast to the first communications path where the customer utilized the M800 service by dialing an "800" number.) However, business 300 may desire to collect billing-information for the single customer transaction which was comprised of the two communications paths, i.e., receive a combination of the previously separate billing-records for each communications path in order to better track expenses. Therefore, in accordance with another feature of the invention, it is possible to correlate these billing records by using data base techniques as known in the prior art so as to provide business 300 with a single transaction billing-record combining the billing-records of the individual communications paths. In FIG. 1, billing-records data base 270 is representative of any number of well-known techniques for recording and providing billing information in a telecommunications network. (For example, billing-records data base 270 can be comprised of a plurality of smaller data-bases and a central computer facility, each one of the data bases being connected to one of the 4 ESS switches in switching network 200 and the central computer facility.) FIG. 5 is a flow diagram of an illustrative billing method for correlating or synchronizing the billing-record information provided to business 300. It is assumed that the first illustrative method is used in establishing the second communications path, i.e., on receipt of the "800" telephone call from the customer, business 300 automatically requests the second communications path be established to the customer using the customer's ANI (i.e., business 300 places a POTS telephone call to customer terminal 110).

When the transaction between the customer and the business is concluded, e.g., the customer hangs up thereby signalling an end to the transaction, telecommunications network 500 will terminate both communications paths. Upon terminating the first communications path, i.e., the "800" telephone call, 4 ESS 210 sends the "800" billing-record information to billing-records data base 270 (block 211) which is then received and recorded by billing-records data base 270 (block 271). Upon terminating the second communications path, i.e., the POTS telephone call, 4 ESS 220 sends the POTS billing-record information to billing-records data base 270 (block 221) which is then received and recorded by billing-records data base 270 (block 272). When billing-records data base 270 has both billing-records for each of the communications paths, billing-records data base 270 correlates the billing-record information, using well-known data base techniques, to provide a combined billing-record for the single transaction between the customer and the business (block 273).

The foregoing merely illustrates the principles of the invention. For instance, the customer or the business can also automatically establish the second communications path later in the conversation. Also, other information besides ANI can be used to identify the customer and the business. In addition, the business and the customer can use any mix of BRI and PRI facilities (e.g., both the business and the customer can subscribe to BRI facilities). In fact, the communications paths do not have to be ISDN and the terminals do not have to be ISDN compatible equipment, e.g., a customer using a "tip-ring" voice line can establish a first communications path to a business which subscribes to ISDN facilities, and the business can automatically establish a second communications path via a cable TV connection to the customer's TV set. Finally, the telecommunications network configuration used herein is merely representative, i.e., other network and configuration architectures can be used; for example, as mentioned hereinabove, a cable TV network can be included within the telecommunications network to provide the second communications path. As a result, it should be realized that the invention is not limited to this particular embodiment and that additional embodiments, modifications and applications which will become obvious to those skilled in the art are included in the spirit and scope of the invention.

I claim:

1. A method for exchanging audio information and image information between a calling party and a called party, the method comprising the steps of:
   receiving an ISDN message, from the calling party, in a telecommunications network, the ISDN message including a request to provide a first communications path and a second communications path between the calling party and the called party;
   establishing the first communications path between the calling party and the called party, where the first communications path exchanges the audio information between the calling party and the called party; and
   establishing the second communications path between the calling party and the called party through the telecommunications network, where the second communications path exchanges the image information between the calling party and the called party;
   where the audio information on the first communications path and the image information on the second communications path are exchanged concurrently.

2. The method of claim 1 comprising the further step of terminating the first communications path and the second communications path between the calling party and the called party.

3. The method of claim 2 wherein the step of terminating includes the steps of:
   recording a plurality of billing-records that includes an audio billing-record for the first communications path and an image billing-record for the second communications path between the calling party and the called party; and
   providing a transaction billing-record that includes the plurality of billing records.

4. The method of claim 1 wherein the ISDN message in the receiving step is an ISDN D-channel call SETUP message.

5. The method of claim 1 wherein the first communications path and the second communications path both terminate in an ISDN facility at the calling party location and the called party location, each respective ISDN facility providing a different B channel for the audio information and the image information.

6. A method for providing a second communications path between a calling party and a called party through a telecommunications network, the method comprising the steps of:
   receiving a network address of the calling party from the telecommunications network at a location of the called party as a result of establishing a first communications path between the calling party and the called party through the telecommunications network, the calling party network address identifying the calling party's location in the telecommunications network;
   providing audio information to the calling party on the first communications path through the telecommunications network;
   sending an ISDN message to the telecommunications network, the ISDN message including a request to establish the second communications path to the calling party's location, the request including the calling party network address;
   receiving an ISDN message from the telecommunications network that the second communications path is being provided; and
   providing image information on the second communications path to the calling party, where the image information is exchanged concurrently with the audio information.

7. The method of claim 6 wherein the calling party network address is an automatic number identification of the calling party.

8. The method of claim 6 wherein the audio information is provided to the calling party on a B-channel of an ISDN facility and the image information is provided to the calling party on a different B-channel of the ISDN facility.

9. The method of claim 6 comprising the further step of terminating the first communications path and the second communications paths between the calling party and the called party.

10. The method of claim 9 wherein the step of terminating includes the steps of:
    recording a first billing-record for the first communications path between the calling party and the called party;
    recording a second billing-record for the second communications path between the calling party and the called party; and
    providing a transaction billing-record that includes the first billing-record and the second billing-record.

11. Apparatus for exchanging information between a calling party and a called party, the apparatus being comprised of:
    calling party terminal means for providing an ISDN request for a first communications path and a second communications path between the calling party and the called party;
    called party terminal means for providing and receiving audio information to the first communication path and for providing image information to the second communication path;
    means responsive to the ISDN request for providing the first communications path and the second communications path between the calling party terminal means and the called party terminal means, where the first communications path provides for the exchange of audio information and the second communications path provides for the exchange of image information, the exchange of audio information and image information occurring simultaneously on the two communications paths.

12. The apparatus of claim 11 wherein the providing means is further comprised of a telecommunications network.

13. The apparatus of claim 12 wherein both the first communications path and the second communications path are different B-channels of an ISDN facility.

14. The apparatus of claim 12 wherein the request provided by the calling party terminal means is further comprised of an ISDN, D-channel, Q.931, call SETUP message.

15. The apparatus of claim 12 wherein the calling party terminal means is further comprised of:
   calling party voice terminal means for providing and receiving audio information to and from the first communications path; and
   calling party data terminal means for at least receiving the image information from the second communications path.

16. The apparatus of claim 15 wherein the called party terminal means is further comprised of:
   called party voice terminal means for providing and receiving audio information to and from the first communications path; and
   called party data terminal means for at least providing the image information to the second communications path.

17. The apparatus of claim 15 wherein the called party terminal means is further comprised of:
   switching equipment means for providing and receiving audio information to and from the first communications path, and for at least providing the image information to the second communications path; and
   called party voice terminal means for providing and receiving audio information to and from the switching equipment means; and
   called party data terminal means for at least providing the image information to the switching equipment means.

18. The apparatus of claim 12 wherein the telecommunications network is further comprised of means for providing a transaction billing record that includes a bill for the first communications path and another bill for the second communications path.

19. Apparatus for automatically providing a second communications path between a calling party and a called party, the apparatus being comprised of:
   a calling party voice terminal;
   a called party voice terminal;
   a calling party data terminal;
   a called party data terminal;
   a first communications path for exchanging audio information between the calling party voice terminal and the called party voice terminal;
   means responsive to a network address of the calling party for providing an ISDN request for the second communications path; and
   network means for providing the called party network address and for providing the second communications path for exchanging image information between the calling party data terminal and the called party data terminal in response to the ISDN request;
   where the audio information on the first communication path and the image information on the second communications path are exchanged concurrently, and the second communications path is terminated in a B-channel of an ISDN facility at both a location of the calling party and a location of the called party.

20. The apparatus of claim 19 wherein the means responsive to the calling party network address information is the called party's premise switching equipment.

21. The apparatus of claim 20 wherein the first communications path is terminated in a B-channel of an ISDN facility at both the location of the calling party and the location of the called party.

22. The apparatus of claim 20 wherein the network means is further comprised of means for providing a transaction billing-record to the called party, the transaction billing-record including a bill for the first communications path and another bill for the second communications path.

* * * * *